Sept. 11, 1956 C. E. HUFFMAN 2,762,949

COMPARATOR CIRCUIT

Filed July 27, 1951 2 Sheets-Sheet 1

INVENTOR.
CHARLES E. HUFFMAN

BY Darby & Darby

ATTORNEYS

Sept. 11, 1956 C. E. HUFFMAN 2,762,949

COMPARATOR CIRCUIT

Filed July 27, 1951 2 Sheets-Sheet 2

INVENTOR.
CHARLES E. HUFFMAN

BY Darby & Darby
ATTORNEYS

United States Patent Office 2,762,949

Patented Sept. 11, 1956

2,762,949

COMPARATOR CIRCUIT

Charles E. Huffman, Upper Montclair, N. J., assignor to Allen B. Du Mont Laboratories, Inc., Clifton, N. J., a corporation of Delaware Application July 27, 1951, Serial No. 238,990

8 Claims. (Cl. 315—26)

This invention relates to electrical circuits, and more particularly concerns a comparator circuit which functions to derive a single output signal from and in accordance with a plurality of input signals.

An object of the invention is to provide a comparator circuit for use in a system of television registration control.

Another object is to provide a gated comparator circuit for use in a registration control system for interlaced television scanning.

A further object is to provide a circuit which will compare input signals of like polarity and differing amplitudes and which will derive therefrom an output signal having an amplitude proportional to the difference in amplitudes of said input signals and having a polarity in accordance with relative magnitudes of said input signals.

Other objects will be apparent.

The present invention is particularly useful in conjunction with a television registration control structure such as is described in copending application Serial No. 789,295, Patent No. 2,684,454.

The present invention is also useful in conjunction with the integrating circuit for registration control described in copending application Serial No. 238,991, now Patent No. 2,673,929.

In the drawings—

Figure 1:
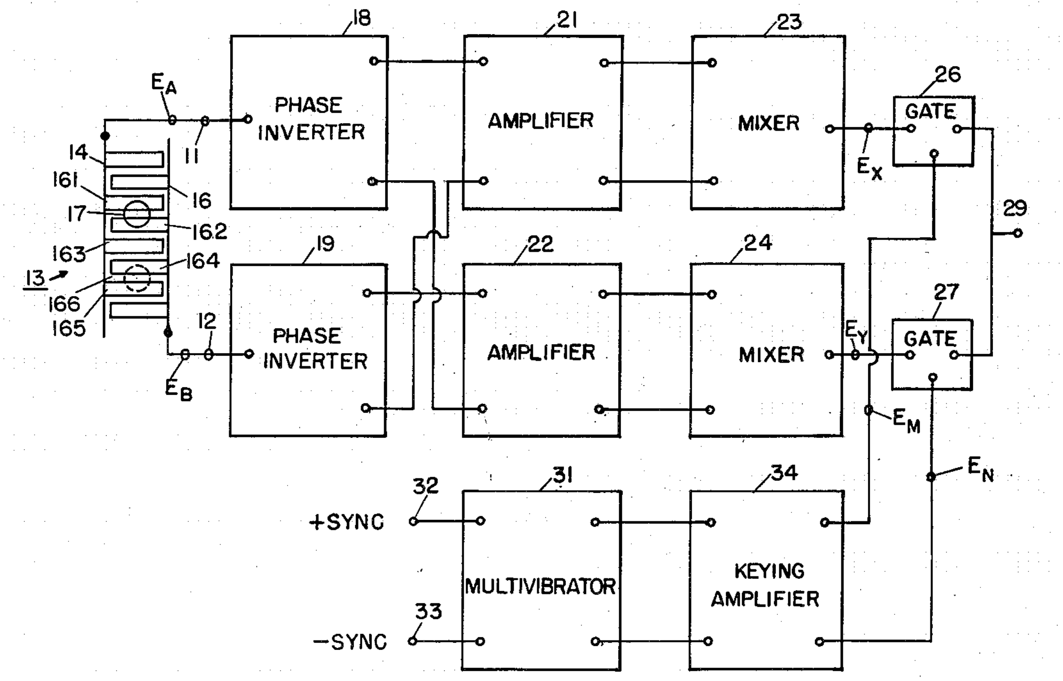
Figure 1 is a block diagram of a preferred embodiment of the comparator circuit.

In Figure 1, input terminals 11 and 12 are connected to a source 13 of voltage $E_A$ and $E_B$ respectively which are characterized by the property of having equal polarities and variably differing amplitudes. A suitable source 13 is the control structure described in the above mentioned copending application Serial No. 789,295, now Patent No. 2,684,454, which comprises two sets 14, 16 of conductive elements arranged to produce control signals $E_A$ and $E_B$ when impinged upon by an electron beam 17. Said structure 13 may be located in a cathode-ray tube adjacent a picture screen.

The input terminals 11 and 12 are connected respectively to an A-channel phase inverter 18 and a B-channel phase inverter 19. Push-pull amplifiers 21 and 22 are connected to the phase inverters 18 and 19, respectively, in a transposed manner; i. e., one output terminal of the A-channel inverter 18 is connected to an input terminal of the A-channel amplifier 21 and the remaining output terminal of said phase inverter is connected to an input terminal of the B-channel phase inverter 22; similarly, one output terminal of the B-channel phase inverter 19 is connected to an input terminal of the B-channel amplifier 22 and the remaining output terminal of said phase inverter is connected to an input terminal of the A-channel amplifier 21. The output terminals of the push-pull amplifiers 21 and 22 are connected to mixer circuits 23 and 24, respectively. Gating circuits 26 and 27 are connected to the outputs of mixer circuits 23 and 24 and to terminals $E_X$ and $E_Y$, respectively. The output terminals of the gating circuits 26 and 27 are connected together and to a signal output terminal 29. A multivibrator circuit 31, having a positive synchronization terminal 32 and a negative synchronization terminal 33, is connected to a keying amplifier 34 the push-pull output of which is connected to the gating circuits 26 and 27.

Figure 4:
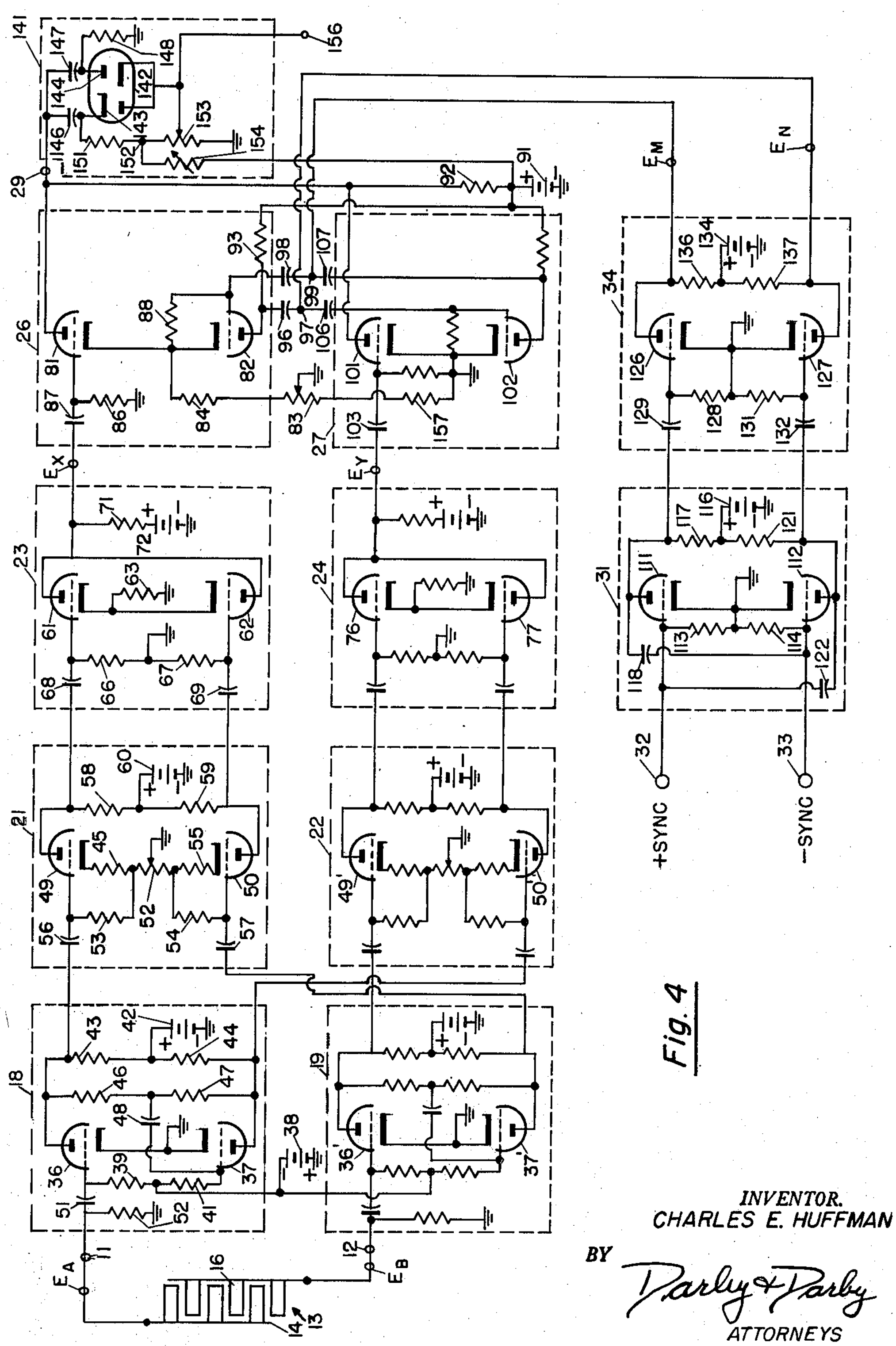
Figure 4 is a schematic diagram of a preferred embodiment of the invention.

In the schematic diagram of Figure 4, the A-channel phase inverter 18 comprises triode tubes 36 and 37, the cathodes of which are connected to a grounded bias voltage source 38 through resistors 39 and 41 and whose anodes are connected to a grounded voltage source 42 through resistors 43 and 44. Said anodes are also connected through resistors 46 and 47 and capacitor 48 to the grid of the tube 37. The grid of tube 36 is connected through a capacitor 51 to a grounded load-resistance 52 and to the A-channel input terminal 11. The circuit of the B-channel phase inverter 19 comprises triode tubes 36′ and 37′; the circuit connections are identical with those of the A-channel phase inverter 18. The input of said B-channel phase inverter 19 is connected to the B-channel input terminal 12.

The A-channel amplifier 21 comprises triode tubes 49 and 50 having cathodes which are connected through resistors 45 and 55 to opposite ends of a potentiometer 52 having an adjustable tap which is grounded. The grids of said tubes are connected through resistors 53 and 54 to said potentiometer and are connected through capacitors 56 and 57 respectively to the plate of the A-channel phase inverter tube 36 and to the plate of tube 37′ in the B-channel phase inverter 19. The anodes of tubes 49 and 50 are connected through resistors 58 and 59 respectively to a grounded voltage source 60. The B-channel amplifier 22 comprises triode tubes 49′ and 50′; the circuit is identical with that of the A-channel amplifier 21. The input connections of said B-channel amplifier are connected to the anode of tube 37 in the A-channel phase inverter 18 and to the anode of the tube 36′ in the B-channel phase inverter 19.

The A-channel mixer 23 comprises triode tubes 61 and 62 of which the cathodes are grounded through a resistor 63; the grids are grounded through resistors 66 and 67 and are connected through capacitors 68 and 69 to the anodes of the amplifier tubes 49 and 50, respectively. The anodes of the mixer tubes 61 and 62 are connected together and to a terminal $E_X$ and through a resistance 71 to a grounded voltage source 72. The B-channel mixer 24 comprises triode tubes 76 and 77; the circuit is identical with that of the A-channel mixer 23. The input connections of said B-channel mixer 24 are connected to the anodes of the B-channel amplifier tubes 49′ and 50′. The anodes of the B-channel mixer tubes 76 and 77 are connected together and to the signal terminal $E_Y$.

The A-channel gating circuit 26 comprises triode tubes 81 and 82 having cathodes which are connected together and to a potentiometer 83, having a grounded tap, through a resistor 84. The grid of tube 81 is connected to ground through a resistor 86 and to terminal $E_X$ through a capacitor 87. The grid of tube 82 is connected to said cathode through a resistor 88. The anode of tube 81 is connected to the output terminal 29 and to a grounded voltage source 91 through a resitor 92. The anode of tube 82 is connected through a resistor 93 to said voltage source 91. The anode of tube 82 is also connected through a capacitor 96 to a first keying terminal 97; the grid of tube 82 is connected through a capacitor 98 to a second keying terminal 99.

The B-channel gating circuit 27 comprises triode tubes 101 and 102; the circuit is identical with that of the A-channel gating circuit. The grid of tube 101 is connected through a capacitor 103 to the terminal $E_Y$; the anode of tube 101 is connected to said terminal 29; the grid of tube 102 is connected through a capacitor 106 to said first keying terminal 97; the anode of tube 102 is connected through a capacitor 107 to said second keying terminal 99.

The multivibrator circuit 31 comprises triode tubes 111 and 112 of which the cathodes are grounded. The grid of tube 111 is connected to ground through a resistor 113 and to the positive synchronization signal terminal 32. The grid of tube 112 is connected to ground through a resistor 114 and to the negative synchronization signal terminal 33. The anode of tube 111 is connected to a grounded voltage source 116 through a resistor 117 and to the grid of tube 112 through a capacitor 118. The anode of tube 112 is connected to said voltage source 116 through a resistor 121 and to the grid of tube 111 through a capacitor 122.

The keying amplifier 34 comprises triode tubes 126 and 127 of which the cathodes are grounded. The grid of tube 126 is connected through a resistor 128 to ground and through a capacitor 129 to the anode of tube 111 in the multivibrator circuit 31. The grid of tube 127 is connected through a resistor 131 to ground and through a capacitor 132 to the anode of tube 112 in said multivibrator circuit 31. The anodes of tubes 126 and 127 are connected to a grounded voltage source 134 through resistors 136 and 137, respectively. The anode of tube 126 is connected to the second keying terminal 99; the anode of tube 127 is connected to the first keying terminal 97.

A noise-reducing circuit 141 comprises a dual diode tube 142 having a cathode 143 and an anode 144 connected through capacitors 146 and 147, respectively, to the terminal 29. Said anode 144 is connected to ground through a resistor 148. Said cathode 143 is connected through a resistor 151 to a junction 152; a potentiometer 153 is connected between said junction and ground; a rheostat 154 is connected between said junction and said voltage source 91. The remaining anode and cathode of said dual diode tube 142 are connected together and to an adjustable tap on said potentiometer 153 and to a final output terminal 156. If desired, the integrating circuit of the above mentioned copending application Serial No. 238,991 may be connected to said output terminal 156.

Figure 2:
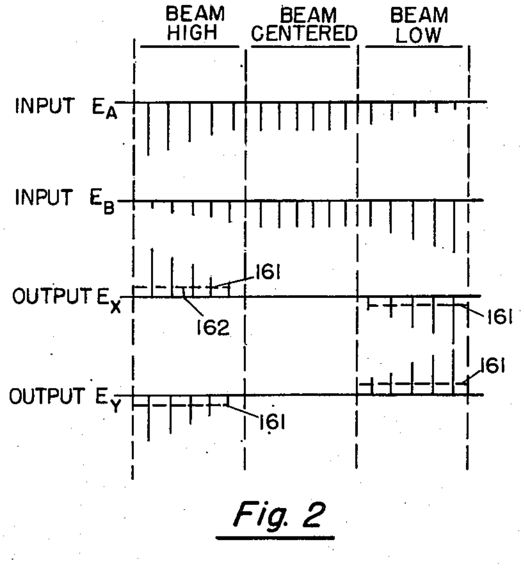
Figure 2 shows a comparison of output signals obtainable when different types of input signals are provided.

The comparator circuit operates as follows:

Signals $E_A$ and $E_B$ have the same polarity but variably differing amplitudes. These signals may be generated by an electron beam striking the control structure 13, as is more fully explained in the above mentioned copending application Serial No. 789,295. When the electron beam 17 is properly positioned during a scanning line, it impinges equally upon two elements 161 and 162 (refer to Fig. 1) of the sets 14 and 16, respectively, of conducting elements. When the beam is thus properly registered, signals $E_A$ and $E_B$ of equal amplitude and equal polarity are generated. If said beam 17 is too high, it will impinge more upon element 161 and less upon element 162 and signal $E_A$ will be greater than signal $E_B$. On the other hand, if the electron beam 17 is too low, it will impinge more upon element 162 than on element 161 and the signal $E_B$ will be greater than signal $E_A$. The signals $E_A$ and $E_B$ under these conditions are illustrated in Figure 2. In Figure 2, the signals $E_A$ and $E_B$ are shown as a series of pulses of short duration and differing amplitudes, each pulse being generated during a scanning line of the electron beam during the time when said beam impinges upon the control structure 13. It will be seen that if the beam is too high, the input $E_A$ is correspondingly greater in magnitude and the signal $E_B$ is correspondingly less, depending upon how much too high the beam is. The same result occurs if the beam is too low, except that the relative magnitude of signals $E_A$ and $E_B$ are reversed.

Each space between adjacent conductive elements of the structure 13 represents the position of a desired scanning line of the electron beam 17. In an interlaced system of television scanning, alternate lines; viz., odd lines, are scanned during one field and the remaining lines; viz., even lines, are scanned during the next succeeding field, etc. The position shown for the electron beam 17 in Figure 1 may be, for example, an odd scanning line. The next scanning line, then, of beam 17 will be such that the beam will impinge upon the elements 163 and 164, etc. Thus, the beam has skipped the even-numbered line in which it would impinge upon the elements 162 and 163. It is noted that for each odd-numbered scanning line the upper element upon which the beam impinges is attached to the set 14 of elements, and the lower element upon which said beam 17 impinges during each odd-numbered scanning line is attached to the set 16 of elements. For each odd-numbered scanning line, then, if the beam is too high the signal $E_A$ will be greater and $E_B$ will be less; and if the beam is too low, signal $E_B$ will be greater and $E_A$ will be less.

Conversely, during fields in which the even-numbered lines are scanned, the relative positions of the elements are reversed so that if the beam is too high, the signal $E_B$ will be greater and the signal $E_A$ will be less; i. e., the polarities of the signals become reversed when scanning even lines rather than odd lines. A representative position of the beam during an even-numbered scanning line is designated by the numeral 166. The gating circuits function to correct for the change of signal polarity when alternate fields are scanned.

The A-channel phase inverter 18 provides a push-pull output signal which varies in accordance with the input signal $E_A$. The B-channel phase inverter 19 provides a push-pull output in accordance with the input signal $E_B$. The push-pull output signals of the phase inverters are transposed into the amplifiers 21 and 22. The push-pull output signals of each of said amplifiers will be equal in amplitude if the input signals $E_A$ and $E_B$ are equal. If the input signals are not of equal amplitudes, the push-pull output of each amplifier 21 and 22 will be unbalanced. The mixer circuits amplify the push-pull signals and provide at their output terminals, $E_X$ and $E_Y$, respectively, signals which are proportional to the difference in amplitude of the push-pull signals, respectively, of each amplifier. In Figure 2, the mixer output signals $E_X$ and $E_Y$ are shown in relation to the input signals $E_A$ and $E_B$. Output signals $E_X$ and $E_Y$ each comprise a series of signal pulses, each of which is derived from a corresponding set of pulses in the input signals $E_A$ and $E_B$. Output signals $E_X$ and $E_Y$ are at times opposite in polarity and equal in amplitude with respect to each other. The magnitudes of the output pulses $E_X$ and $E_Y$ are proportional to the difference between the amplitudes of the corresponding input signal pulses $E_A$ and $E_B$. In the condition where the electron beam is properly registered, the input signals $E_A$ and $E_B$ have equal magnitudes and the corresponding output signals $E_X$ and $E_Y$ have zero amplitudes. The polarity of the output signals $E_X$ and $E_Y$ varies in accordance with the relative magnitudes of the input signals $E_A$ and $E_B$.

For a television system not having interlaced scanning, either one of the output signals $E_X$ or $E_Y$ can be used to actuate an electron beam position correcting device. The beam position correcting device, as is described in the above-mentioned copending patent application Serial No. 789,295, may comprise a deflection generator which is connected to drive the electron beam vertical deflection system of the picture tube. The beam correcting device, when actuated by the signals $E_X$ or $E_Y$, causes the rate of vertical deflection to accelerate or decelerate so as to cause proper registration of the electron beam on the succeeding horizontal scansion paths. For television systems having interlaced scanning, the beam position correcting device may be connected to be actuated by the gated signal from the terminal 29 of Fig. 1 or 156 of Fig. 4. The choice of whether to use the signal $E_X$ or $E_Y$ will depend upon the polarity required to properly actuate said beam correcting circuit. For example, referring to Fig. 2, if the electron beam is too high, the input signal $E_A$ will be greater than $E_B$ and the voltage $E_X$ or $E_Y$ derived therefrom will actuate a corrective circuit to move the beam relatively downward during the next succeeding scanning line. If the electron beam is too low, signal $E_B$ will be greater than $E_A$ and the output signal $E_X$ or $E_Y$ will be of such polarity as to cause said beam to be moved relatively upward during the next succeeding scanning line. If the beam is properly centered, signals $E_A$ and $E_B$ are equal and no output signal will occur.

Figure 3:
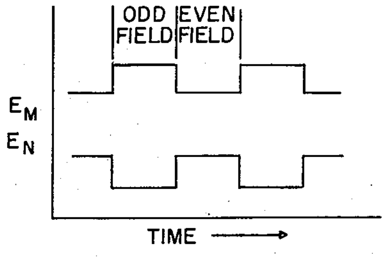
Figure 3 shows the nature of a gating signal in the circuit.

When an interlaced system of scanning is employed, it is desirable to reverse the polarity of the correcting signal during alternate frames, since the relative positions of the elements of the sets 14 and 16 of the control structure 13 are relatively reversed in position as has been explained in detail above. Accordingly, the gating circuits 26 and 27 function to switch the output terminal 29 alternately between the two output signal terminals $E_X$ and $E_Y$. The gating circuits are keyed by keying signals $E_M$ and $E_N$, illustrated in Figure 3, so that gating circuit 26 is on when gating circuit 27 is off and vice versa. The keying occurs at the end of each field. The keying signals $E_M$ and $E_N$ are generated by the multivabrator 31 which may be synchronized by either a positively or negatively polarized synchronizing signal connected to synchronizing terminal 32 or 33. The synchronizing signal should repetitively occur at the field repetition rate.

The keying signal is coupled to the gating tube 81 by means of a common cathode resistor 84; the gating tube 101 is similarly coupled through a common cathode resistance 157. The potentiometer 83 is adjusted to obtain proper balance of the signal outputs of the A-channel and B-channel mixers.

The noise-reducing circuit 141 is preferably included, and functions to remove a small portion of signals $E_X$ and $E_Y$ at a signal level which is designated by the numeral 161 in Figure 2. Said noise-reducing circuit 141 accordingly removes any small noise pulses or keying transients 162 which may have occurred in the circuit. The potentiometer 153 is adjusted to obtain proper balance of the threshold levels of conduction of the dual diode tube 142. The rheostat 154 is adjusted to obtain the desired threshold level. The amplitudes of the output signals at the output terminal 156 will be, therefore, slightly less than that of said signals at the terminal 29.

The values of components in the circuit shown may be determined by one skilled in the art and may be altered in accordance with exact operating conditions desired. The tubes employed in the various circuits may be, for example, type 6SN7 triode and type 6H6 diode tubes. The amplifiers shown in the preferred circuit may be omitted if amplification is not required. The potentiometer 52 in the amplifier 21 is adjusted to provide a properly balanced push-pull output signal from said amplifier. The phase inverters 18 and 19 may, if desired, comprise transformers instead of the circuit shown. Other substitutions and alternatives may be readily made by one skilled in the art.

Although the invention has been particularly described in an application involving registration of an electron beam in a cathode ray tube, it will be apparent to those skilled in the art that the invention will have applications in other fields of work where it is desired to compare a plurality of signals and derive an output signal in accordance therewith. Although a preferred embodiment has been shown for comparing two input signals, it will be apparent that the principles disclosed may be adapted for comparing three or more signals; if desired, a plurality of comparator circuits may be connected in cascade for comparing compared signals.

What is claimed is:

1. A circuit for comparing electric signals, comprising a plurality of sources of input signals, a corresponding plurality of phase inverters connected one to each of said sources and each providing a push-pull output signal, a corresponding plurality of mixer circuits connected to receive said push-pull signals from said phase inverters, each of said latter connections comprising a transposed coupling.

2. A circuit for comparing electric signals, comprising a plurality of sources of input signals, a corresponding plurality of phase inverters connected one to each of said sources and each having a first and a second output terminal and means for providing at said terminals a push-pull signal derived from the corresponding input signal, a corresponding plurality of mixer circuits each having a first and a second input terminal, a connection between each said first input terminal and a different one of said first output terminals, and a connection between each said second input terminal and the second output terminal of a different one of said phase inverters other than the phase inverter to which first input terminal is connected.

3. A signal comparator circuit comprising a first input signal source, a second input signal source, a first phase inverter connected to said first input signal source and having a first and a second output terminal and means to provide at said terminals a push-pull signal derived from said first input signal, a second phase inverter connected to said second input signal source and having a first and a second output terminal and means to provide at said latter terminals a push-pull signal derived from said second input signal, a first mixer having a first and a second input terminal, a connection between said first output terminal of said first phase inverter and said first input terminal of said first mixer, a connection between said second output terminal of said second phase inverter and said second input terminal of said first mixer, a second mixer having a first and a second input terminal, a connection between said first output terminal of said second phase inverter and said first input terminal of said second mixer, and a connection between said second output terminal of said first phase inverter and said second input terminal of said second mixer.

4. A system for registration of the scanning of an electron beam, comprising a control structure positioned to be scanned by said electron beam, means for deriving from said control structure a plurality of electronic signals which vary in amplitude in accordance with the position of said scaninng beam, a corresponding plurality of phase inverters connected each to receive one of said signals and each having push-pull output terminals, a corresponding number of mixer circuits each having a pair of input terminals, a connection between each one of each said input terminals and one of said output terminals of each of said phase inverters, a connection between each remaining input terminal and a remaining output terminal of each one of said phase inverters other than the phase inverter to which said first mentioned input terminal is connected, and means for utilizing signals obtained from said mixers to achieve registration of said electron beam.

5. Apparatus for controlling the scanning registration of an electron beam in an interlaced scanning system, comprising a control structure positioned to be scanned by said electron beam and means to provide a pair of beam-position-responsive signals therefrom, a pair of phase inverters each having push-pull output terminals and each connected to receive one only of said signals, respectively, a pair of mixer circuits each having a pair of input terminals connected in transposition to said push-pull output terminals of said phase inverters and each providing a mixed output, an output terminal, a pair of gate circuits connected to alternately switch said mixed outputs to said output terminal, and a synchronized keying circuit connected repetitively to switch said gate circuits at the field repetition frequency of said interlaced scanning.

6. A comparator circuit comprising means for supplying at least two signals of the same polarity and normally variably differing amplitude, means for inverting the phases of said signals and providing push-pull signals, means for transposing and mixing said push-pull signals, an output circuit and means fed by said mixed push-pull signals for alternately applying said mixed push-pull signals to said output circuit.

7. In the combination of claim 6, said last means including a synchronizing signal source.

8. In an electrical circuit, a plurality of sources of push-pull signals, and a corresponding plurality of mixer circuits connected to receive said push-pull signals, said connections being transposed whereby each said mixer circuit receives a signal from each said source.

References Cited in the file of this patent

UNITED STATES PATENTS

| | | |
|---|---|---|
| 1,773,116 | Potter | Aug. 19, 1930 |
| 2,221,115 | Shepard, Jr. | Nov. 12, 1940 |
| 2,226,238 | Doba, Jr. | Dec. 24, 1940 |
| 2,226,459 | Bingley | Dec. 24, 1940 |
| 2,312,761 | Hershberger | Mar. 2, 1943 |
| 2,385,563 | Beers | Sept. 25, 1945 |
| 2,421,312 | Bobb | May 27, 1947 |
| 2,421,747 | Engelhardt | June 10, 1947 |
| 2,442,770 | Kenyon | June 8, 1948 |
| 2,449,524 | Witherby et al. | Sept. 14, 1948 |
| 2,458,291 | Munster et al. | Jan. 4, 1949 |
| 2,466,207 | Carpentier | Apr. 5, 1949 |
| 2,541,313 | Vossberg, Jr. et al. | Feb. 13, 1951 |
| 2,574,946 | White | Nov. 13, 1951 |